(12) United States Patent
Willis et al.

(10) Patent No.: US 6,431,431 B2
(45) Date of Patent: Aug. 13, 2002

(54) APPARATUS AND METHODS FOR WAVE SOLDERING

(75) Inventors: Scott E. Willis; Greg Hueste, both of Camdenton, MO (US)

(73) Assignee: Speedline Technologies, Inc., Camdenton, MO (US)

( * ) Notice: Subject to any disclaimer, the term of this patent is extended or adjusted under 35 U.S.C. 154(b) by 0 days.

(21) Appl. No.: 09/802,197

(22) Filed: Mar. 8, 2001

Related U.S. Application Data (60) Provisional application No. 60/188,068, filed on Mar. 9, 2000, provisional application No. 60/188,253, filed on Mar. 10, 2000, and provisional application No. 60/188,276, filed on Mar. 10, 2000.

(51) Int. Cl.[7] .............................. B23K 1/08; B23K 1/00; B23K 31/02
(52) U.S. Cl. .............................. 228/37; 228/33; 228/260
(58) Field of Search .............................. 228/33, 36, 37, 228/40, 45, 56.1, 180.1, 256, 259, 260

(56) References Cited

U.S. PATENT DOCUMENTS

| | | | |
|---|---|---|---|
| 4,509,670 A | 4/1985 | Cammarata | 228/34 |
| 4,666,077 A * | 5/1987 | Rahn et al. | 118/410 |
| 4,802,617 A | 2/1989 | Deambrosio | 228/180.1 |
| 4,886,201 A | 12/1989 | Deambrosio et al. | 228/37 |
| 5,048,746 A * | 9/1991 | Elliott et al. | 228/180.1 |
| 5,203,489 A * | 4/1993 | Gileta et al. | 228/180.1 |
| 5,228,614 A | 7/1993 | Elliott et al. | 228/37 |
| 5,240,169 A | 8/1993 | Gileta | 228/180.1 |
| 5,397,049 A | 3/1995 | Gileta et al. | 228/37 |

FOREIGN PATENT DOCUMENTS

| | | |
|---|---|---|
| DE | 3628569 | 2/1988 |
| FR | 2587257 | 3/1987 |

* cited by examiner

Primary Examiner—Tom Dunn
Assistant Examiner—Zidia Pittman
(74) Attorney, Agent, or Firm—Mintz, Levin, Cohn, Ferris, Glovsky and Popeo, P.C.

(57) ABSTRACT

Apparatus for use in wave soldering applications can include an adjustable wing device, a front gate and/or a mounted member. Each of these components are easily adjustable, thereby improving the quality of the soldered product and allowing for improved process efficiency and decreased downtime of the wave soldering equipment.

12 Claims, 6 Drawing Sheets

APPARATUS AND METHODS FOR WAVE SOLDERING

RELATED APPLICATIONS

This application claims the benefit of the following U.S. provisional patent applications: Ser. No. 60/188,068, filed Mar. 9, 2000; Ser. No. 60/188,253, filed Mar. 10, 2000; and Ser. No. 60/188,276, filed Mar. 10, 2000. The entire teachings of each of these provisional patent applications are incorporated herein by reference.

FIELD OF THE INVENTION

Inventions described herein relate to improved apparatus and methods that can be used in assembling a printed circuit board or printed wiring board, particularly in wave soldering systems.

BACKGROUND OF THE INVENTION

Wave soldering systems utilize wave nozzles of various designs and configurations that incorporate pumps to produce a wave of molten solder through which printed circuit boards are conveyed for solder application. Ideally, wave nozzles should be designed and constructed to deliver a smooth, non-turbulent solder wave to a solder application site. Many wave nozzles, however, do not accomplish this objective and produce solder waves that are not sufficiently smooth and which are turbulent. Further, many wave nozzle configurations comprise numerous components that must be periodically disassembled during wave soldering for maintenance and cleaning and, more particularly, for removal of dross.

Dross comprises metal oxides which form at the interface between air and the surface of molten solder. As a solder wave moves through a wave nozzle, the surface of the solder wave is often turbulent from the action of nozzle components generating and circulating the solder wave from a molten solder pot or reservoir to the site of solder application through which printed circuit boards are conveyed. Such turbulence exposes metal alloys at the surface of the solder wave to air causing the metal alloys to interact with air and oxidize to form metal oxides. Dross is an accumulation of such metal oxides typically formed on the surface of molten solder held in reservoirs and on wave nozzle components exposed to solder wave turbulence. Dross accumulation must be removed from nozzle components to maintain the performance of the wave nozzle. Therefore, wave nozzles are periodically disassembled during operation for maintenance and dedrossing.

Existing methods for reducing the formation of dross in wave nozzles include application of oil to the surface of the solder wave, the incorporation of a dross reduction tray, as disclosed in U.S. Pat. No. 4,802,617, assigned to the assignee of the present invention, and maintenance of a particular level of solder in a solder receiving tray that minimizes the free fall of molten solder on return of molten solder to a reservoir, as disclosed in U.S. Pat. No. 4,886,201, assigned to the assignee of the present invention.

Although existing wave nozzle construction and wave soldering techniques reduce dross formation, they do not reduce dross formation sufficiently to significantly reduce production downtime and operational costs associated with disassembling and dedrossing wave nozzle components. Measures to reduce the turbulence of a solder wave would reduce the susceptibility of a solder wave to surface oxidation and, therefore, would reduce dross formation on nozzle components. In addition, existing nozzles cause splashing of molten solder typically at a load site when a wave nozzle begins operation. Tiny droplets of molten solder can splash from a solder wave and disperse outside a wave nozzle, producing hazardous burn conditions. Measures to reduce splashing of molten solder in wave soldering would reduce such a hazard.

Additionally, a wing device may be used as part of the nozzle. The nozzle may include a chimney, or tunnel, which typically directs the flow of a solder wave. The solder may then flow over various plates to provide a reservoir of liquid for a printed circuit board (PCB) to contact. For example, in a wave solder machine, a PCB may travel from a front plate toward a wing device while its leads are being soldered. Every time a different PCB passes through a wave solder machine the wing device may need to be adjusted.

Previous wing devices required the machine to be stopped, and the solder pot, or reservoir of solder, to be lowered so that the wing height could be adjusted to accommodate a different PCB in a new batch. This procedure is time consuming, difficult and dangerous due to the high temperature of the solder. A typical solder pot may hold 2,000 pounds (900 kg) of solder at temperatures in excess of 500° F. (260° C.). The operator has to stop the wave solder machine and lower the solder pot which causes expensive production line downtime. These long setups lead not only to increased machine downtime, but also to more setup PCB and solder scrap. This discontinuous setup process may also make it difficult to obtain a high quality solder joint in a reasonable amount of time. If the first machine setup is incorrect, the machine must be stopped again, and the setup process steps repeated (more downtime) until a quality solder joint is produced or until the operator accepts the marginal quality and runs the boards.

Optimal accuracy of the device is obtained by designing a system that has a level reservoir of solder. Previous wave solder machines have used unstable wing devices that are prone to bowing and twisting under the extreme thermal stress, resulting in a non-level wave of solder. Without a level plane of solder, inconsistent solder joints are formed across the length of each printed circuit board resulting in increased PCB rejections. Bowing and twisting of the wing element may also cause solder leakage which, in turn, leads to excessive dross formation.

Solder leakage along the wing device is also a problem because it causes excessive turbulence, and therefore, excessive oxidation of the solder, which produces (dross) waste. The removal of this dross then leads to machine downtime and wasted maintenance resources. Previous wing devices, or solder nozzle systems, also suffered from leakage due to warpage of the wing device.

Previous wave soldering systems have also included mounted members for handling substrates after the substrates pass over the nozzle. However, the mounted members have not been easily adjustable to accommodate differences in the amount of solder applied to different substrates as well as other processing differences.

SUMMARY

A wave soldering system of this invention includes a wave nozzle having a chimney that defines a passage through which solder can be delivered. The chimney has a source end that can be coupled with a source of solder, such as a solder pot, and an exit from which the solder can be ejected onto a substrate. The wave nozzle further includes adjustable components that enhance operation efficiency. In accordance with various aspects of the invention, the system can include a pivotable wing element and/or a pivotable gate for directing solder flow out of the nozzle as well as an adjustable mounting device for handling substrates after they pass over the wave nozzle. All of these components can be mounted on a solder pot.

In accordance with one aspect of the invention, a pivotable wing element is attached to a hinge at an end proximate to the exit of the nozzle, and an adjustable member is provided to rotate the wing about the hinge to thereby raise and lower a solder wave when the nozzle is operating. In one embodiment, the adjustable member includes a rotatable shaft to which a protruding member is fixed.

In accordance with another aspect of the invention, a pivotable gate can be mounted to swing toward and away from a front plate over which the solder wave flows. The gate can be pivoted to accommodate more or less solder flow between the gate and the front plate. The gate can also include a perforated baffle angled to reduce turbulence in a solder wave. The mounting device can include a mounted member, such as a hot air knife, positioned to act on a substrate after it passes over the nozzle. In one embodiment, the mounting device is mounted on the solder pot and the mounted member is rotatable toward and away from the nozzle.

Many advantages are offered by the various aspects of this invention.

In accordance with one aspect of the invention, the wing device of a wave nozzle is designed for quick and easy adjustment. Easy adjustment of the wing element decreases machine downtime due to quicker setups and maintenance of the machine. Designs of the wing device, described herein, also substantially eliminate bowing and twisting of the wing device during nozzle operation. Additionally, solder leaks, which cause increased turbulence, oxidation of solder and formation of dross, can be eliminated or greatly reduced by embodiments of the wing device described herein. Reducing leaks and dross formation substantially reduces the maintenance required to clean off dross and reduces wasted solder. Further still, the wing device can reduce wave solder machine setup time and down time and improve PCB quality by ensuring consistent quality solder joints.

In accordance with another aspect of the invention, a wave nozzle with a front gate can be constructed to eliminate the hazards associated with splashing molten solder and reduce dross formation on wave nozzle components to reduce production downtime and operational costs associated with wave soldering.

With each different PCB that passes across the nozzle, there are different components and lead lengths, and therefore different amounts of solder being applied to the PCB. Every time a new batch of PCB's is passed through the machine, the mounted member may need to be adjusted and therefore, a quick adjustment mechanism is desired. Use of a mounting device of this invention can provide such a quick and easy adjustment means. In particular, the mounting devices described herein can ensure quick and easy access to the structure upon which it is mounted (e.g., a solder pot) due to the easy movement of the mounting device from a process position to the maintenance position. Setup and down times on the machine or solder pot are thereby reduced. Additionally, easy and real-time four-way adjustability of the mounting device can be offered while the machine or solder pot is running in the process position, thereby providing quicker setup times, less downtime and higher quality PCB's.

BRIEF DESCRIPTION OF THE DRAWINGS

The above and other features and advantages of this invention will be more readily apparent from a reading of the following detailed description of various aspects of the invention taken in conjunction with the accompanying drawings in which.

DETAILED DESCRIPTION OF THE INVENTION

Referring to the figures set forth in the accompanying drawings, illustrative embodiments of the present invention will be described in detail, below.

Figure 1:
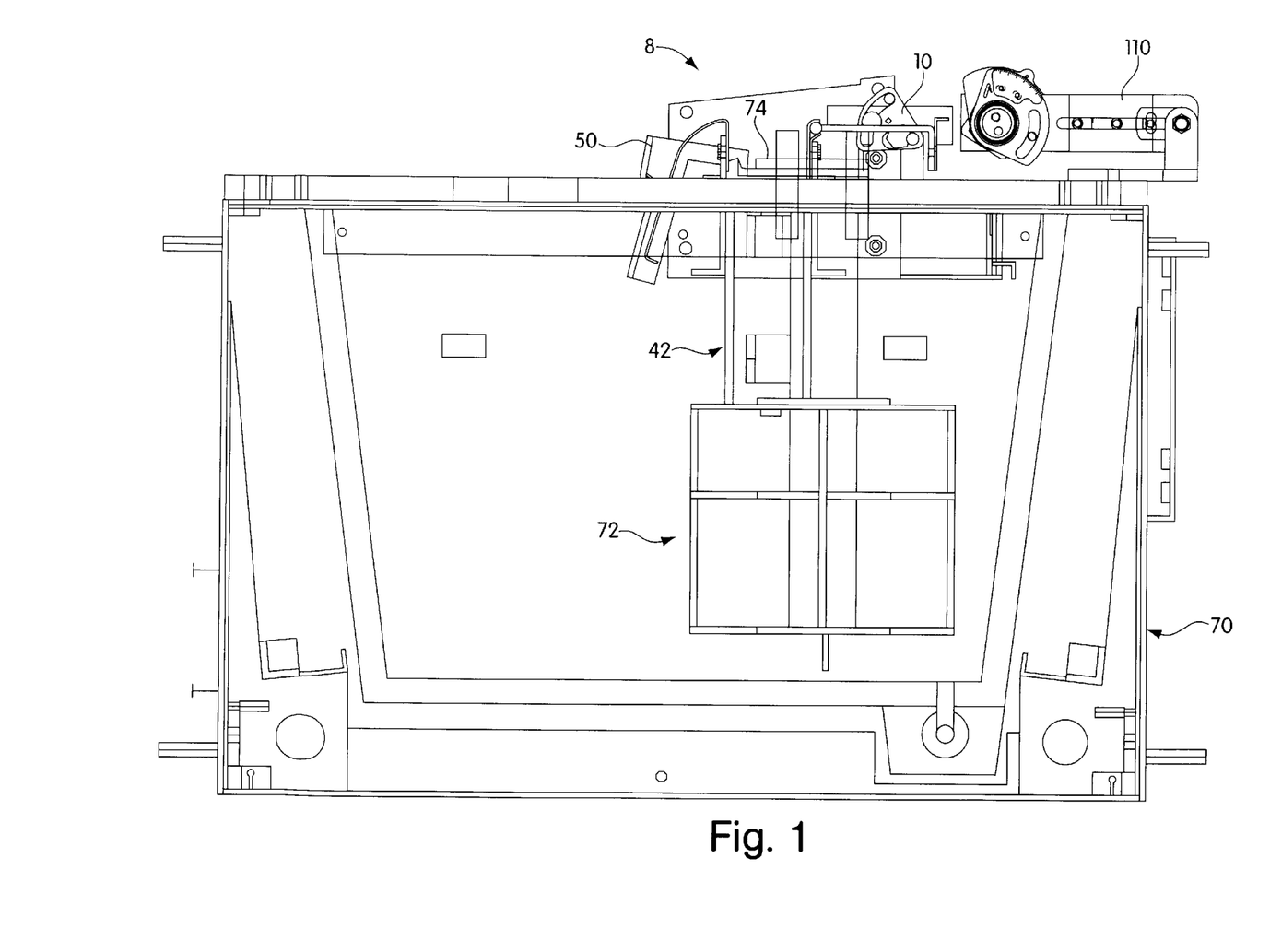
FIG. 1 is a side view of a wave soldering system including a solder pot, nozzle, front gate and mounting device.
Figure 2:
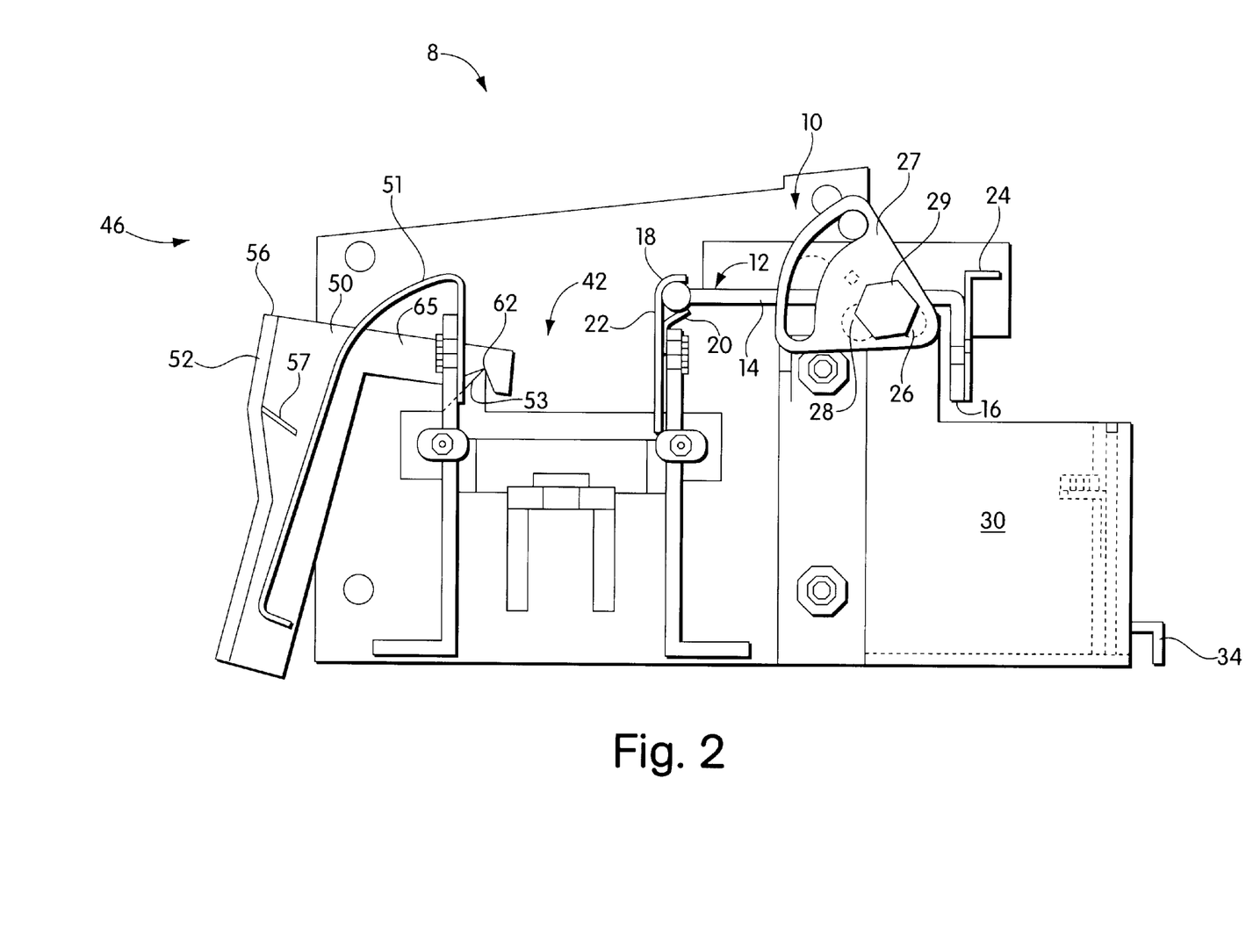
FIG. 2 is an isolated close-up view of the nozzle illustrated in FIG. 1.

A nozzle 8 including a front gate 50 and a mounting device 110, which can be used in a wave solder machine, are mounted on a solder pot 70 in FIG. 1. As shown in FIG. 2, an arrow 46 indicates the entrance path of a PCB across the nozzle 8. The nozzle 8 typically is coupled with a reservoir of solder, e.g., in the form of a solder pot 70, from which solder is pumped via a flow duct 72 through a passage in the form of chimney 42. The flow duct is connected with the solder pot 70 via mounting plates 74. The solder then flows out of the nozzle 8 in one direction over an outer hinge 22, onto a wing element 12 and up against a plate 24. The solder also flows in an opposite direction over a front plate 51 and through a channel between front plate 51 and pivotable front gate 52. During normal operation conditions, the nozzle 8 will have printed circuit boards traveling on suitable conveying means or chains over the solder reservoir. The solder from the nozzle 8 secures the leads of the components on the printed circuit board so as to ensure a sound electrical connection between the component and pad or other device on the PCB.

Figure 5:
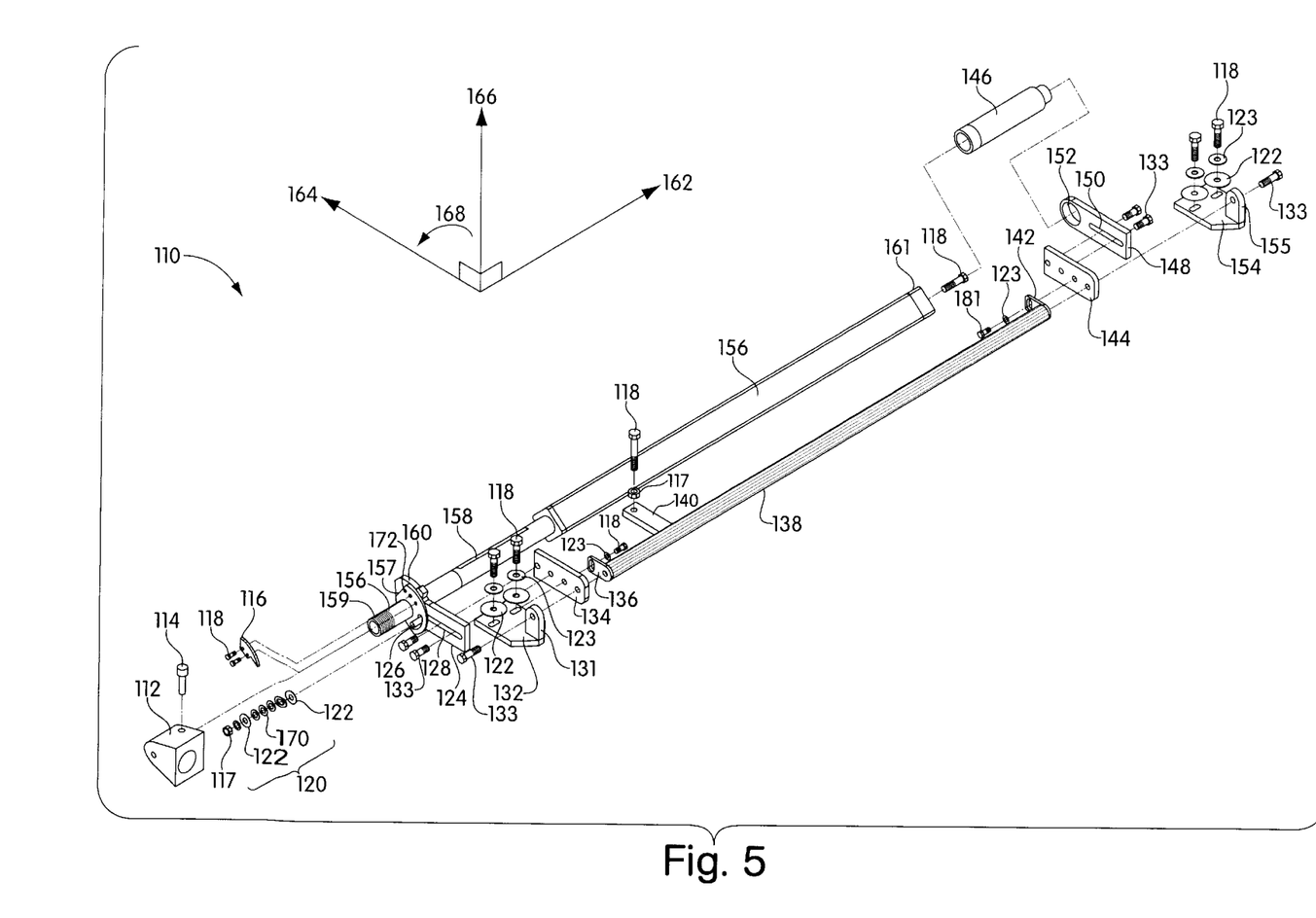
FIG. 5 is an exploded perspective view of a mounting device.
Figure 6:
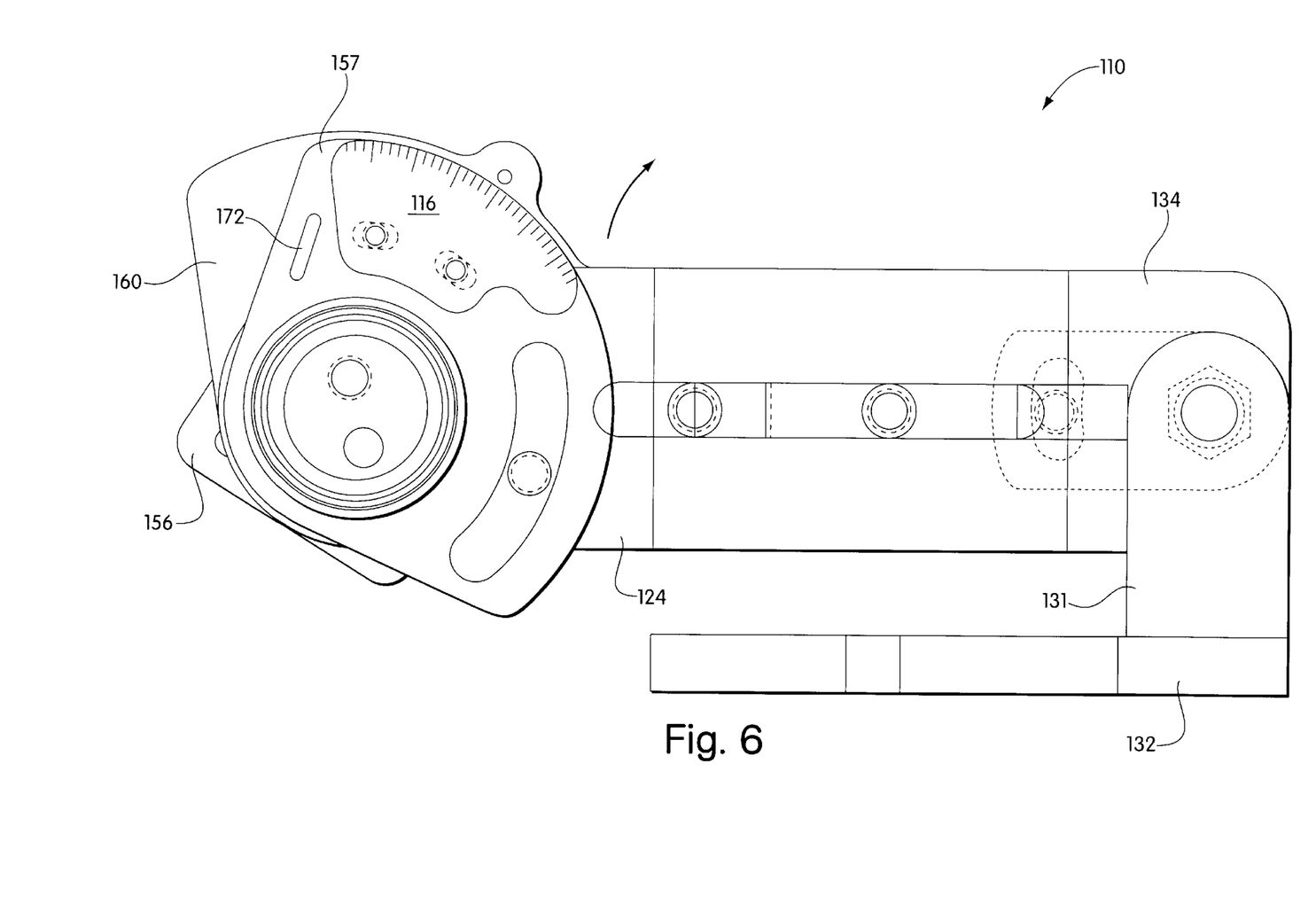
FIG. 6 is a partial sectional view from the left side of the mounting device of FIG. 5 in a process position.

After traversing the plate 24, the PCB will then travel over a mounting device 110, illustrated in FIGS. 1, 5, and 6, including a mounted member 156. In one embodiment, the mounted member 156 directs a heated fluid onto the PCB which heats and substantially blows away any excess solder to prevent any potential PCB short circuits.

Figure 3:
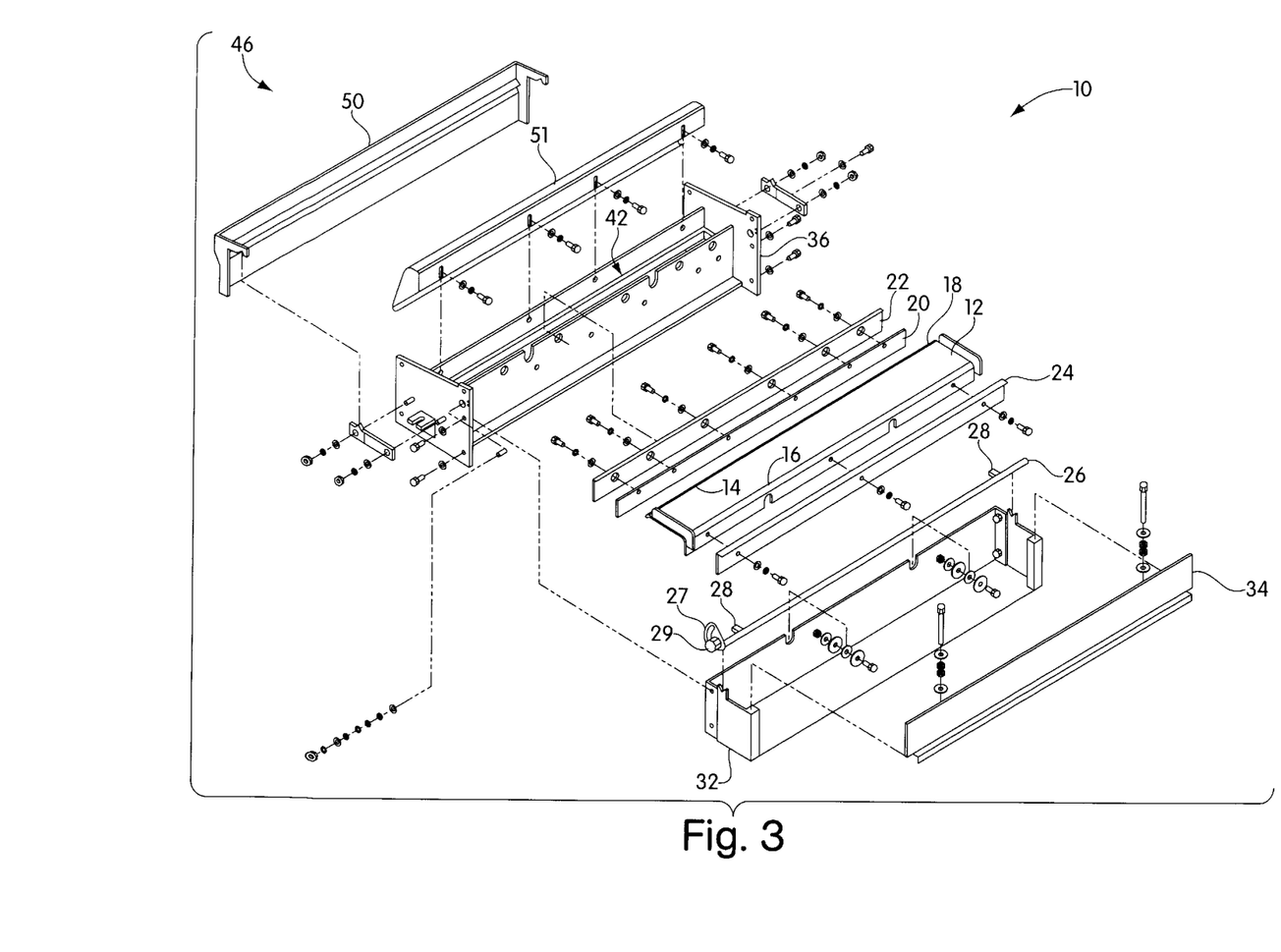
FIG. 3 is an exploded perspective view of the nozzle of FIG. 2, particularly illustrating a wing device.

The wing device 10 can be seen on the nozzle 8 illustrated in FIG. 2, while an exploded illustration of the wing device 10 is provided in FIG. 3. Wing element 12 has a first side 14 and a second side 16. The second side 16 of the wing element 12 is typically integrally disposed with a plate 24. In one embodiment, the wing element 12 has a long rectangular shape. In this embodiment, the components of the wing device 10 may be formed of steel, or alternatively from other alloys or ceramics. These durable materials allow the wing device 10 to withstand extreme temperature environments without failure.

The wing element 12 can be disposed with a cylindrical member 18 on the first side 14 of the wing element 12. This cylindrical member 18 typically extends along the entirety of the first side 14 of the wing element 12 and engages with an outer hinge 22. Another portion of cylindrical member 18 is connected or disposed with inner hinge 20. Both the inner hinge 20 and the outer hinge 22 are coupled with a support member 30, shown in FIG. 2.

Support member 30 includes a face plate 34, a high section 36 and a low section 32, as shown in FIG. 3. Support member 30 typically extends across and below the surface of the wing element 12. A shaft 26 is adapted to be pivotably engaged with the support member 30. The two ends of the shaft 26 may be supported by the support member 30 or other structure. At least one protruding member 28 is disposed integrally with the shaft 26.

The wing device 10 is shown in a specific embodiment in FIG. 3; however, the various components are not limited to the shapes as illustrated, and other component shapes may be used without detracting from the invention.

As previously described, during normal operation mode, the solder covers the wing element 12 and also flows over the front plate 51. While the machine is running, the second side 16 of the wing element 12 can be adjusted or pivoted up or down to affect the height of the solder wave flowing across the wing element 12. This wing element 12 adjustment is accomplished by using a shaft 26. The shaft 26 has at least one adjustable member, e.g., in the form of protruding member 28 or cam, for lifting the wing element 12 when the shaft 26 is rotated. Lifting of the wing element 12 is easily accomplished while the machine is still in the operation or process condition (i.e., when liquid or solder in the machine is still covering the wing element 12).

With each different PCB, there are different components and lead lengths, and therefore different required wave solder heights. Every time a new batch of PCB's is passed through the machine, the wing element 12 may need to be adjusted. The wing device 10 provides a quick and easy means for providing that adjustment.

In maintenance mode, the wing element 12 can be easily flipped up by turning the shaft 26, even without having to lower the solder level below the level of the wing element 12. The shaft 26 can be turned via a hex nut 29 on a surface plate 27, illustrated in semi-transparent form, wherein the hex nut 29 is coupled with a motor for rotation. In one embodiment, the range of adjustment of the wing element 12 is approximately 60 degrees; however, the invention is not limited to this angle of adjustment, and the device may be modified (e.g., by adjusting the size and shape of the protruding member 28 or by adjusting the range of surface plate rotation) to adjust the wing element 10 to any degree. The range of rotation affords easy access for the cleaning and removal of dross and other undesirable substances from the device.

When raised and lowered via rotation of the protruding member 28, as described above, the wing element 12 pivots about a hinge created by the cylindrical member 18 and the outer hinge 22 and inner hinge 20. The design of the hinge, which may be described as a ball-and-socket-type hinge because of the cylindrical member 18, substantially eliminate solder leaks.

Figure 4:
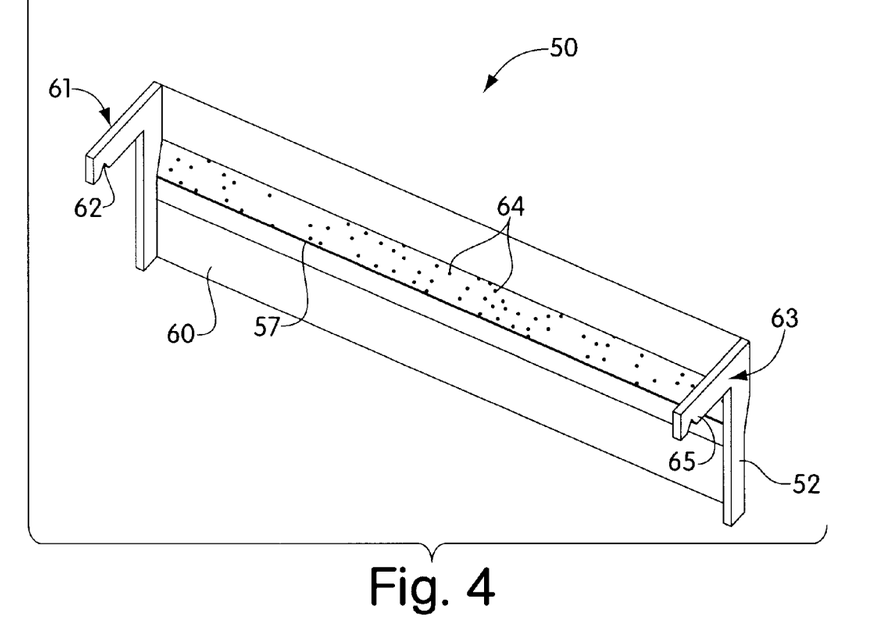
FIG. 4 is a perspective view of a front gate.

Further, as illustrated in FIG. 2, another aspect of the present invention provides a front gate 50 mounted at a load side of the front plate 51 of the wave nozzle 8. As shown in FIG. 4, the front gate 50 includes an elongated back portion 60 having at each terminal end an end plate 61 and 63 welded thereto. End plates 61 and 63 are used to mount the front gate 50 to the wave nozzle 8, as shown in FIG. 2.

Each end plate 61 and 63 has a configuration of an inverted "L" with a horizontal portion 65 and a vertical portion 52. Disposed on an underside of the horizontal portion 65 at a terminal end of the horizontal portion is a notch 62. The notch 62 is for placement of the front gate 50 on a pivot point 53 positioned on the load side of the wave nozzle 8 to mount the front gate 50 to the wave nozzle 8. The notch 62 positions the front gate 50 on the pivot point 53 to allow the front gate 50 to freely pivot.

As shown in FIG. 4, a perforated baffle 57 is welded to the back portion 60 of the wave nozzle at an angle of, but not limited to, 115° from a top terminal edge 56 of the vertical portion 52 to the surface of the baffle 57. The baffle 57 includes a strip of steel having a width of, but not limited to, 10 mm, and a plurality of apertures 64 formed therein.

As described above, the front gate 50 freely pivots on the pivot point 53. As a solder wave is delivered through the wave nozzle 8 and falls over the front plate 51 and then returns to the solder pot 70, the flow of the solder wave causes the front gate 50 to automatically pivot or float at the pivot point 53.

As shown in FIG. 2, the horizontal portion 65 pivots upward and downward and the vertical portion 52 floats forward and backward to accommodate the height of the solder wave falling over the front plate 51, which has a substantially-fixed position relative to the nozzle 8. The height of the solder wave increases or decreases as a flow rate of molten solder delivered through the wave nozzle 8 increases or decreases. Once the wave nozzle 8 is set up for operation, the front gate 50 needs no further adjustment from an outside operator as the front gate 50 pivots and automatically adjusts to an appropriate position to accommodate differences in solder wave height. As the height of the solder wave rises, the front gate 50 adjusts by pivoting or floating to create a larger gap between the gate 50 and front plate 51 to accommodate the greater height of the solder wave.

The front gate 50 reduces the impact of the flow of the solder wave as the solder wave free falls over the front plate 51. The pivoting movement of the front gate allows the front gate 50 to adjust its position relative to the height of the solder wave and to reduce the impact of free falling solder against the back portion 60 of the front gate, thereby eliminating splashing of free-falling solder and reducing the turbulence of the solder wave.

As a solder wave passes over the front plate 51, the free falling solder contacts the baffle 57. The automatic pivoting and adjustment of the position of the front gate 50 in response to changes in the height of the solder wave also adjusts an angle of the baffle 57 in relation to the front plate 51 such that, irrespective of solder wave height, the baffle 57 maintains a position at which it reduces the impact and velocity of the free-fall solder and evenly funnels the flow of solder between the front gate 50 and the front plate 51. Such funnel action eliminates the splashing of molten solder when the wave nozzle 8 begins operation and reduces the surface turbulence of the solder wave as it circulates through the wave nozzle 8 and back to the solder pot 70.

A mounting device 110 for controlling a mounted member 156 in a wave solder machine is illustrated in FIGS. 5 and 6. During normal operation mode, the mounted member 156 is in close proximity to the plate 24 of the nozzle 8. Alternatively, during maintenance mode, the mounted member 156 can be easily flipped away from the plate 24, in the direction of the arrow shown in FIG. 6, without the use of tools. The maintenance mode position of the mounting device 110 allows for easy and quick access to perform maintenance on the solder pot 70, shown in FIG. 2, to remove dross waste. The mounting device 110 is also designed to provide real-time four-way adjustability of the mounted member 156.

As shown in the embodiment of the mounting device 10 illustrated in FIG. 5, a knuckle 112, having an oblong shape with a square at its larger end, acts as a manifold to direct a fluid, such as air or gas, from a hose to the mounted member 156. A pin 114 may be inserted into one of the holes in the knuckle 112 to secure the knuckle 112 to the mounted member 156.

The mounted member 156 has threads or grooves on its first end 159 so that it can attach to one of the openings on the knuckle 112. The mounted member 156 has a second end 161, which is attached to an extension 146. In one embodiment, the mounted member 156 is a hot air knife used on a solder pot for debridging solder on a PCB after wave soldering. The air knife is positioned about one-eighth to one-quarter of an inch (about 3 to 6 mm) below the substrate and blows hot gas (typically air or nitrogen) onto the PCB. The function of the solder debridging knife is to prevent shorts in a PCB by removing excess solder on the surface of the board. The air knife may also have a mesh 158 for controlling fluid flow through the knife. Additional air knife features and methods for its use are described in U.S. Pat. No. RE 32,982; U.S. Pat. No. 5,228,614; and U.S. Pat. No. 4,995,411. Each of these patents is incorporated herein by reference in its entirety.

Further still, the mounting device 110 can be designed to support mounted members of different lengths. The second end 161 of the mounted member 156 includes a cap coupled to the mounted member 156 with a fastener 118. A second end of the extension 146 fits into a second adjuster opening 152 of the second slide adjuster 148.

A first mount 132 and second mount 154 securely attach at the ends of the mounting device 110 and are also firmly secured to a permanent structure, such as the solder pot 70 illustrated in FIG. 1. The first mount 132 firmly attaches one end of the mounting device 110 to the permanent structure; this attachment is accomplished via fasteners 118. Washers, split washers and other mechanical expedients may be used to firmly secure the faster to the structure. The first and second mounts 32 and 54 include bores that serve as pivot points for the mounting device 110 to rotate from a process position (shown in FIG. 5) to a maintenance position in which the mounted member 56 is rotated clockwise about 180° or more and vice versa. As shown in FIG. 5, the bore is defined by a protrusion 131 in the first mount 132; the protrusion 131 provides a support for threaded shaft 133, which passes through the bore. The threaded shaft 133, which may also be a shoulder bolt, attaches to the first fixture and to the first end member 136 of the connector 138. The threaded shaft 133 may also function as a bushing or bearing.

A second mount 154 also includes a second protrusion 155, which has a bore, and the second protrusion 155 likewise provides a support for threaded shaft 133. The threaded shaft 133 may also be a shoulder bolt. The threaded shaft 133 attaches to the second fixture 144 and the second end member 142 of the connector 138. The threaded shaft 133 may also function as a bushing or bearing. The connector 138 is firmly attached to the second fixture 144 via a fastener 118, optionally including a split washer 123. Similarly, the first end member 136 is firmly attached to the first fixture 134 via a fastener 118, optionally including a split washer 123.

The first fixture 134 is a flat member with openings. The openings are used to provide an attachment support for various components. For example, at least one threaded shaft 133 is used to adjustably couple the first slide adjuster 160 (through the first adjuster slot) to the first fixture 134. This arrangement allows for easy and quick real-time (while the process is running) adjustments in the direction of the x-axis arrow 162 and in the direction of the y-axis arrow 164. Adjustment along the y-axis 164 is accomplished by loosening the threaded shaft 133 and sliding the mounted member 156 and its assembly in the first adjuster slot 128. Adjustment along the x-axis 162 is made by turning the threaded shaft 133 in one direction or the other.

Adjustment along the x-axis 162 can also be made on the other end of the mounting device 110 at the second slide adjuster 148. A threaded shaft 133 is also used to adjustably couple the second slide adjuster 148 (through the second adjuster slot 150) to the second fixture 144. In addition, y-axis 164 adjustment is accomplished by loosening the threaded shaft 133 and sliding the mounted member 156 and its assembly in the second adjuster slot 150.

A connector 138 is typically a cylindrical or rectangular-shaped member disposed between the first mount 132 and second mount 154. A fastener 118, a split washer 123, and/or a washer 122 may be used to further dispose the connector 138 with the first fixture 134 and likewise with the second fixture 144. The connector 138 and many of the other materials used in this assembly are made of stainless steel. Stainless steel is preferred because it can withstand harsh environments, such as those faced when the mounting device 110 is used on a solder pot that releases harmful gas byproducts from fluxes.

A rigid member 140 is disposed with the connector 138. In a first embodiment, the rigid member 140 is welded to the connector 138 and is a flat bracket extending outward. Rigid member 140 also has a fastener 118 or bolt threaded into the rigid member 140. The bolt also has a nut 117 threaded onto the fastener 118. The fastener 118 and nut 117 may be adjusted to firmly place the fastener 118 at various heights along the z-axis 166. For example, if the fastener 118 is threaded through the rigid member 140 to a certain height, it props the mounting device 110 on an angle; and further fastener adjustments will accordingly adjust the mounting device 110 along the z-axis 166 and in the direction of the alpha arrow 168. After the fastener 118 is adjusted to the appropriate height, the nut 117 is adjusted to secure the fastener 118.

A scale 116 is superposed in the mounted member flange 157 and disposed integrally with fasteners 118. This scale 116 functions to provide a reference for all mounted member 156 adjustments in the direction of the alpha arrow 168. The mounted member flange 157 defines a slot 172 in which a screwdriver may be inserted while in process mode (real time) to adjust the angle of the mounted member 156 in the direction of the alpha arrow 168.

A preload attachment assembly 120 functions to adjustably attach the mounted member flange 157 to the first slide adjuster 124. The preload attachment assembly 120 comprises one or more nuts 117, washers 122, and spring discs 170. An elongated member 126 is permanently affixed to the first slide adjuster 124. In this first embodiment, the elongated member 126 is threaded at its end and attaches with the preload attachment assembly for a releasably firm fit. This adjustable attachment is tightened to a level where it sufficiently secures the mounted member 156, while still enabling its angle to be adjusted in real time with the flip of a screwdriver (into the slot 172). This feature allows the mounting device 110 to be adjusted in the direction of the alpha arrow 168.

The foregoing description is intended primarily for purposes of illustration. Although various aspects of the invention have been shown and described with respect to exemplary embodiments thereof, it should be understood by those skilled in the art that the foregoing and various other changes, omissions, and additions in the form and detail thereof may be made therein without departing from the scope of the invention, which is intended to be limited only by the appended claims.

What is claimed is:

1. A wave nozzle comprising:

a chimney defining a passage through which solder can be delivered, the chimney having a source end that can be coupled with a source of solder and an exit from which the solder can be expelled from the nozzle and onto a substrate;

a front plate positioned to receive solder expelled from the exit of the chimney; and a front gate pivotably mounted to swing toward and away from the front plate to regulate solder flow through a channel between the front plate and front gate.

2. The wave nozzle of claim 1, further comprising a source of solder coupled with the source end of the passage.

3. The wave nozzle of claim 1, further comprising a pump positioned to drive solder through the chimney.

4. The wave nozzle of claim 1, wherein the front gate includes a back portion and a baffle extending from the back portion into the channel.

5. The wave nozzle of claim 4, wherein the baffle is perforated.

6. The wave nozzle of claim 4, wherein the baffle is angled to reduce turbulence and splashing of the solder flowing through the channel.

7. The wave nozzle of claim 4, wherein the front gate includes a notch about which the front gate pivots.

8. The wave nozzle of claim 7, further comprising a pivot point upon which the notch of the front gate is pivotably mounted.

9. A wave soldering system comprising:

a solder source;

a nozzle coupled with the solder source to deliver solder from the solder source to a position where the solder can contact a substrate passing over the nozzle; and a mounting device positioned to act on a substrate after it passes over the nozzle, the mounting device including a mounted member, and the mounting device being adjustable to rotate the mounted member toward and away from the nozzle.

10. The wave soldering system of claim 9, wherein the mounting device is mounted to the solder source.

11. The wave soldering system of claim 9, wherein the mounted member is a hot air knife.

12. The wave soldering system of claim 11, wherein the hot air knife is designed to blow a heated gas onto the substrate.

* * * * *